United States Patent Office 3,723,091
Patented Mar. 27, 1973

3,723,091
METHOD OF KILLING UNDESIRED PLANTS
AND INSECTS
Andre Allais, Les Lilas, and Pierre Girault, Paris, France,
assignors to Roussel-UCLAF, Paris, France
No Drawing. Filed July 17, 1968, Ser. No. 745,365
Claims priority, application France, July 18, 1967,
114,639; June 6, 1968, 153,981
Int. Cl. A01n 9/24
U.S. Cl. 71—122                             16 Claims

ABSTRACT OF THE DISCLOSURE

Pesticidal halogenated organic compounds derived from 1-phenyl-2,2-dihalogeno ethanol, of general Formula I:

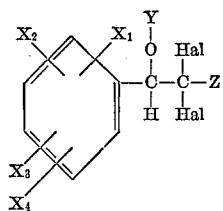

(I)

wherein $X_1$ is selected from the group consisting of hydrogen, a halogen atom, a nitro group, a substituted or unsubstituted lower alkyl, and a lower alkyloxyl, $X_2$, identical with $X_1$ or different from $X_1$ is selected from the group consisting of hydrogen, a halogen atom, a substituted or unsubstituted lower alkyl and a lower alkyloxyl, $X_3$ and $X_4$, identical with or different from one another and identical with or different from $X_1$ and/or $X_2$ are selected from the group consisting of hydrogen and a halogen atom, Y is selected from the group consisting of hydrogen, a lower alkyl, a lower acyl and a group derived from a mineral acid, Z is selected from the group consisting of hydrogen and a lower alkyl, Hal is selected from the group consisting of a chlorine, a bromine and a iodine atom.

OBJECT OF THE INVENTION

It is an object of the invention to provide novel pesticidal halogenated organic compounds of Formula I.

It is another object of the invention to provide a process for the preparation of the compounds of Formula I.

It is a further object of the invention to provide novel intermediates useful in the production of the compounds of Formula II.

It is yet a further object of the invention to provide novel pesticidal compositions containing an effective amount of at least one of the compounds of Formula I.

It is an additional object of the invention to provide novel pesticidal control methods.

These and other objects and advantages of the invention will become obvious from the following detailed description.

The novel pesticidal products of the invention are the halogenated organic compounds of the Formula I

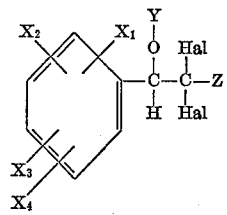

(I)

wherein $X_1$ is selected from the group consisting of hydrogen, a halogen atom, a nitro group, a substituted or unsubstituted lower alkyl, and a lower alkyloxyl, $X_2$, identical with $X_1$ or different from $X_1$ is selected from the group consisting of hydrogen, a halogen atom, a substitued or unsubstituted lower alkyl and a lower alkyloxyl, $X_3$ and $X_4$, identical with or different from one another and identical with or different from $X_1$ and/or $X_2$ are selected from the group consisting of hydrogen and a halogen atom.

Y is selected from the group consisting of hydrogen, a lower alkyl, a lower acyl and a group derived from a mineral acid, Z is selected from the group consisting of hydrogen and a lower alkyl, Hal is selected from the group consisting of a chlorine, a bromine and a iodine atom.

The compounds of Formula I are of great industrial interest. They are in fact endowed with remarkable pesticidal properties, specifically fungicidal, insecticidal, herbicidal. The fungicidal properties of these compounds can be demonstrated by tests on Alternaria, Botrytis, Phytophthora, Erysiphe and Fusarium; their insecticidal properties by tests on Drosophila, Calandra and cockroach; their herbicidal properties by tests on beans, clover, Agrostis, oats, chrysanthemum, flax and mustard. Details on the report of these tests on the results which they provide with a certain number of the compounds (I) are given later on.

The post-emergence and pre-emergence herbicidal activity of the compounds of Formula I allows of using them as selective herbicides or as total herbicides, according to the doses used and the plant species treated. For their use as pesticides, the compounds of Formula I are possibly associated with one or more other active compounds. In general, they are mixed with the classical adjuvants used in the like case, such as: solvents, mineral or organic oils, cationic, anionic or non-ionic surface-active agents, agents increasing adherence, inert powders such as talc, clays, silicates, kieselguhr, etc.—specifically they can be presented in the form of powders, granules, suspensions, emulsions or solutions.

The process for preparing the novel compounds of general Formula I is characterized in that one causes a halogen to act on a substituted derivative of acetophenone, of general Formula II:

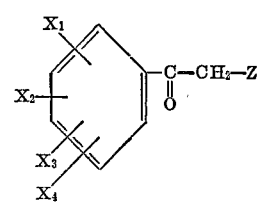

(II)

obtains the corresponding 2,2-dihalogen substituted derivative of acetophenone (III):

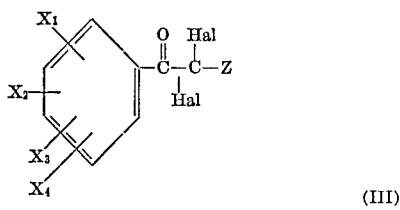

(III)

reduces the ketone function of this compound to a secondary alcohol function by means of a reducing agent or a reducing system, possibly etherifies or esterifies the alcohol function thus formed and obtains the desired corresponding compound (I).

The process of the invention can be carried out advantageously as follows:

The halogenation at the 2-position of the substituted acetophenone (II) is effected for preference by the action of a halogen (chlorine, bromine or iodine) on this compound. This halogenation is effected in times and at temperatures which vary according to the halogen used and to the acetophenone (II) used.

In the case of chlorination, one obtains, in general, good results by fixing the reaction temperature at a value lying between 75° C. and 175° C.

The halogenation is effected either without addition of an organic solvent or in the presence of an organic solvent not reacting with the halogens.

The purification of the crude product can be effected specifically by redistillation, chromatography or crystallization in a solvent or a mixture of suitable solvents.

The reduction of the ketone function of the compounds (III) to a secondary alcohol function is advantageously effected by the Meerwein-Pondorff method. To effect this reduction one uses, for preference, an aluminium alcoholate such as isopropylate or t-butylate, as hydrogen donor a secondary alcohol such as isopropanol or cyclohexanol and one displaces the reaction equilibrium by eliminating by distillation the ketone then formed. This reduction is effected either in an organic solvent such as benzene or toluene, or by using a considerable excess of alcohol, the alcohol then playing at the same time the role of solvent and of reactant. The reduction of the ketone function of the compounds (III) can be equally effected by the action of other reducing agents such as the metallic borohydrides or platinum.

The etherification or esterification of the secondary alcohol function, obtained by reduction of the ketone function, is effected by the classic methods. The etherification is effected specifically by causing an alkyl halide or an alkyl sulphate to act on the alcohol in the presence of a basic agent. In certain cases, it is advantageous to use a milder method of etherification. It is thus that the ethyl ethers of the compounds I can be prepared by the action of triethyloxonium fluoborate.

To esterify the alcohol, one causes, for example, a suitably chosen acid or a functional derivative of that acid such as chloride, symmetrical or mixed anhydride, to act on the alcohol, for preference in the presence of a basic agent, specifically of a tertiary base. The nitric esters of the secondary alcohol obtained by the reduction of the ketone are prepared by the action of nitric acid on the corresponding alcohols, for preference in the presence of a dehydrating agent such as concentrated sulphuric acid or acetic anhydride.

The ketones (II) are obtained by various classic methods. It is convenient to prepare them by using the Friedel and Crafts reaction by causing an acyl chloride

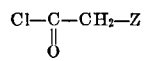

to react with a substituted aromatic derivative:

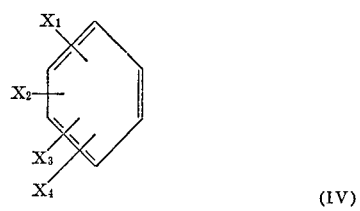

(IV)

in the presence of aluminium chloride. In certain cases, the Friedel and Crafts reaction leads to a mixture of isomeric ketones. It is thus, for example, that the action of acetyl chloride on 4-chlorotoluene in the presence of aluminium chloride leads to the obtaining of a mixture containing approximately 80% of 2'-chloro-5'-methylacetophenone and 20% of 2'-methyl-5'-chloroacetophenone. The product thus obtained, after its conversion according to the process of the invention, can be used for pesticidal purposes.

The invention includes a variant of the above-mentioned process, a variant which is characterized in that one effects acylation of a substituted benzene derivative of general Formula IV, according to the Friedel and Crafts method, by causing a halide of the substituted dihalogeno acetic acid of general Formula V:

(V)

in which (Hal) and Z preserve the previously-given signification, to act on the compound IV, in the presence of a catalyst, such as aluminium chloride specifically, to obtain the compound of general Formula III, then continues as described above.

In addition to aluminium chloride, one can use specifically as catalyst, in order to effect the Friedel and Crafts reaction, boron trifluoride, hydrofluoric acid or sulphuric acid.

This variant is particularly advantageous in the event that the application of the process of the invention leads to a difficultly-separable mixture of ketones, mono-, di- and trihalogenated at the 2-position.

The invention also relates to the pesticidal compositions, specifically fungicidal, insecticidal, herbicidal, containing as active principle one at least of the compounds for Formula I, as well as methods of pesticidal control using the pesticidal compositions according to the invention.

In the following examples there is described a preferred embodiment to illustrate the invention. However, it should be understood that the invention is not intended to be limited to the specific embodiment.

Preparation: 2'-chloro-5'-methylacetophenone

Into 126.5 g. of 4-chlorotoluene (product described by B. Aronheim and G. Dietrich, Ber. 8, 1402 (1875)), one introduces 154 g. of aluminium chloride then, in about an hour, 90 g. of acetyl chloride. One raises the temperature of the reaction mixture to 75° C. by application of external heat and maintains this temperature for one hour. One cools the reaction mixture, pours it into a mixture of ice and aqueous solution of hydrochloric acid, extracts the aqueous solution with ethyl ether, washes the combined ethereal extracts with water, dries them, concentrates them to dryness under reduced pressure, rectifies the residue and obtains 106 g. of 2'-chloro-5'-methylacetophenone, B.P.=110° C. under 4 mm. of mercury.

According to its N.M.R. spectrum, this product contains about 20% of 2'-methyl-5'-chloroacetophenone.

EXAMPLE I 1-(2'-chlorophenyl)-2,2-dichloroethanol (I) with $X_1$=Cl at 2', $X_2$=$X_3$=$X_4$=H, Y=H, Hal=Cl, Z=H Stage A: 2,2,2' - trichloroacetophenone.—Into a calibrated receptacle, one introduces 1560 g. of 2'-chloroacetophenone, product described by R. E. Bowman, J. Amer. Soc. 322 (1950) and causes a stream of gaseous chlorine to bubble into the liquid. The temperature of the reaction medium rises spontaneously to 130° C. in about an hour. One then brings the temperature of the reaction medium to 155° C. by application of external heat and maintains this temperature while continuing the bubbling in of chlorine until the reaction medium no longer absorbs chlorine, that is to say until constant weight of the flask. One cools the reaction mixture, rectifies it and obtains 2,260 g. of 2,2,2'-trichloroacetophenone, B.P.=112–113° C. under 1 mm. of mercury, $n_D^{20}$=1.5670.

As far as is known, this compound is not described in the literature.

Analysis.—$C_8H_5OCl_3$=223.5. Calculated (percent): C, 42.99; H, 2.25; Cl, 47.59. Found (percent): C, 43.0; H, 2.2; Cl, 47.5.

Stage B: 1 - (2'-chlorophenyl)-2,2-dichloroethanol.— Into 6 litres of isopropanol one introduces 2 kg. of aluminium isopropylate then 2.21 kg. of 2,2,2'-trichloroacetophenone in solution in 2.21 litres of isopropanol. One heats the reaction mixture until the start of distillation regulates the heating so as to to collect about 6 litres of distillate in nine hours One introduces 4.6 litres of isopropanol and continues to distil at the same rate. One thus collects 4 litres of distillate in 6 hours. At this moment, that is to say at the end of about fifteen hours of distillation, the distillate contains practically no more acetone. One cools the reaction mixture, pours it over a mixture of ice and aqueous solution of hydrochloric acid, extracts the aqueous solution with isopropyl ether, combines the ethereal extracts, washes the organic solution thus obtained with water, dries it, concentrates it to dryness under reduce pressure, rectifies the residue and obtains 2.07 kg. of 1-(2'-chlorophenyl)-2,2-dichloroethanol, B.P.=127° C. under 4 mm. of mercury, $n_D^{25}$=1.5675.

This compound is identical with that obtained by another route by H. L. Haller et al., J. Amer. Chem. Soc., 67, 1591 (1945).

EXAMPLE II 1-(3'-chlorophenyl)-2,2-dichloroethanol (I) with $X_1$=Cl at 3', $X_2$=$X_3$=$X_4$=H, Y=H, Hal=Cl, Z=H Stage A: 2,2,3' - trichloroacetophenone.—Into a calibrated receptacle containing 1,114 g. of 3'-chloroacetophenone (product described by J. C. E. Simpson et al. J. Amer. Chem. Soc. 646 (1945)), one causes a stream of gaseous chlorine to bubble in. The temperature of the reaction mixture rises spontaneously to 140° C. in about an hour and forty minutes. The exothermic reaction then slackens and one maintains the reaction mixture at 155° C. by application of external heat, while continuing the bubbling in of chlorine. When the theoretical quantity of chlorine has been absorbed, which one verifies by weighing, one stops the bubbling in of chlorine then degasifies the reaction medium by placing it under pressure. The product thus degasified is then rectified and one obtains 1.554 g. of 2,2,3'-trichloroacetophenone, B.P.=120° C. under 4 mm. of mercury, $n_D^{20}$=1.5795.

As far as is known, this compound is not described in the literature.

Analysis.—$C_8H_5OCl_3$=223.5. Calculated (percent): C, 42.99; H, 2.24; Cl, 47.59. Found (percent): C, 43.2; H, 2.4; Cl, 47.3.

Stage B: 1 - (3'-chlorophenyl)-2,2-dichloroethanol.— Into 4.6 litres of isopropanol, one introduces 1.530 kg. of aluminium isopropylate then a solution of 1.150 kg. of 2,2,3'-trichloroacetophenone in 1.150 litre of isopropanol. One heats the reaction mixture under agitation so as to distill off progressively the acetone thus formed and while maintaining the reaction volume constant by simultaneous introduction of isopropanol. At the end of about 5 hours the distillate contains practically no more acetone. One cools the reaction mixture, pours it into a mixture of ice and a aqueous solution of hydrochloric acid. One separates the organic phase by decanting, extracts the aqueous phase with isopropyl ether, combines the extracts with the principal organic phase, washes the organic solution thus obtained with water, dries it, concentrates it to dryness under reduced pressure, rectifies the residue and obtains 997 g. of 1-(3'-chlorophenyl)-2,2-dichloroethanol, B.P.=146° C. under 8 mm. of mercury, $n_D^{20}$=1.5735.

This compound is identical with that obtained by another route by J. M. Nichols, B.P.S. 936, 979.

EXAMPLE III 1-(2'-chloro - 5' - methylphenyl)-2,2-dichloroethanol (I) with $X_1$=Cl at 2', $X_2$=$CH_3$ at 5', $X_3$=$X_4$=H, Y=H, Hal=Cl, Z=H Stage A: 2,2,2'-trichloro-5'-methylacetophenone.—In a calibrated receptacle, one heats, at 120° C., 400 g. of 2'-chloro-5'-methylacetophenone and causes a stream of gaseous chlorine to bubble into it until the reaction mixture has absorbed about 105% of the theoretical quantity of chlorine, say 168.4 g. (which one verifies by weighing). One cools the reaction mixture, rectifies it and obtains 250 g. of 2,2,2'-trichloro - 5' - methylacetophenone, B.P.=117° C. under 1.5 mm. of mercury which one uses as it is for the following stage.

This product contains 2,2,5'-trichloro-2'-methylacetophenone, discernible in the N.M.R. spectrum.

As far as is known, 2,2,2'-trichloro-5'-methylacetophenone is not described in the literature.

Stage B: 1-(2'-chloro - 5' - methylphenyl)-2,2-dichloroethanol.—Into 500 cc. of isopropanol, one introduces 107 g. of aluminium isopropylate then 125 g. of 2,2,2'-trichloro-5'-methylacetophenone in solution in 250 cc. of isopropanol. One heats the reaction mixture under agitation so as to distill off progressively the acetone thus formed. At the end of about three and a half hours the distillate contains practically no more acetone. One cools the reaction mixture, pours it over a mixture of ice and aqueous solution of hydrochloric acid, extracts the aqueous phase with methylene chloride, combines the methylene chloride extracts, washes with water the organic solution thus obtained, dries it, concentrates it to dryness under reduced pressure, rectifies the residue and obtains 55 g. of 1-(2'-chloro-5'-methylphenyl)-2,2-dichloroethanol, B.P.=170° C. under 20 mm. of mercury, used as it is for pesticidal purposes.

This product contains 1-(2'-methyl-5'-chlorophenyl)-2,2-dichloroethanol.

As far as is known, 1-(2'-chloro-5'-methylphenyl)-2,2-dichloroethanol is not described in the literature.

EXAMPLE IV 1-(2',5'-dichlorophenyl)-2,2-dichloroethanol (I) with $X_1$=Cl at 2', $X_2$=Cl at 5', $X_3$=$X_4$=H, Y=H, Hal=Cl Stage A: 2',5'-dichloro - 2,2 - dichloroacetophenone.— Into 80 g. of 2',5'-dichloroacetophenone (product described by Th. de Crauw, Rec. Trav. chim., 50, 753 (1931)) heated at 130° C., one causes to bubble in a stream of gaseous chlorine until absorption of about 30 g. of chlorine. One cools the reaction mixture, rectifies it under reduced pressure and obtains 89 g. of 2',5'-dichloro-2,2-dichloroacetophenone, B.P.=107–109° C. under 0.3 mm. of mercury.

This compound has been described by Stepanov, Zhur. org. Khim. 2(5) 934 (1966).

Stage B: 1-(2',5'-dichlorophenyl)-2,2-dichloroethanol.— Into 120 cc. of isopropanol, one introduces 35 g. of aluminium isopropylate then 38 g. of 2',5'-dichloro-2,2-dichloroacetophenone in solution in 38 g. of isopropanol. One carries the reaction mixture to reflux then maintains it for twelve hours at this temperature. One then eliminates, by distillation, the acetone thus formed, cools the reaction mixture to 20° C. and pours it into a mixture of ice, water and hydrochloric acid. An oily product separates out. One extracts it with methylene chloride, dries the methylene chloride solution, concentrates it to dryness, rectifies the residue and obtains 20 g. of 1-(2',5'-dichlorophenyl)-2,2-dichloroethanol, B.P.=120° under 0.2 mm. of mercury.

Analysis.—$C_8H_6OCl_4$=259.96. Calculated (percent): C, 36.96; H, 2.32; O, 6.15; Cl, 54.55. Found (percent): C, 37.2; H, 2.3; O, 6.4; Cl, 54.5.

As far as is known, this compound is not described in the literature.

EXAMPLE V 1-(2' - methoxy-5'-chlorophenyl)-2,2-dichloroethanol (I) with $X_1$=—$OCH_3$ at 2', $X_2$=Cl at 5', $X_3$=$X_4$=H, Y=H, Hal=Cl, Z=H Stage A: 2'-methoxy - 2,2,5' - trichloroacetophenone.— Into 54 g. of 2-methoxy-5-chloroacetophenone (product described by G. Wittig, Ber. 57, 93 (1924)) one causes to bubble in a stream of gaseous chlorine. The temperature rises spontaneously to about 90° C. in about 30 minutes. By continuing the bubbling in of chlorine, one maintains the temperature of the reaction mixture at 90° C., for a further 40 minutes, by application of external heat. One cools the reaction mixture, under an atmosphere of nitrogen, adds thereto a mixture of equal parts of isopropyl ether and petroleum ether, B.P.=65–75° C., cools, isolates by suction-filtering the precipitate thus formed, washes it, dries it and obtains 53.8 g. of 2'-methoxy-2,2,5'-trichloroacetophenone, M.P.=77° C.

A sample of this product is purified by crystallization in isopropyl ether, M.P.=77° C.

Analysis.—$C_9H_7Cl_3O_2$=253.51. Calculated (percent): C, 42.7; H, 2.78; Cl, 42.0. Found (percent): C, 43.0; H, 2.9; Cl, 41.9.

As far as is known, this compound is not described in the literature.

Stage B: 1-(2'-methoxy-5'-chlorophenyl)-2,2-dichloroethanol.—Into a flask equipped with a rectifying column and a downward-directed condenser, one introduces 220 cc. of isopropanol, 51 g. of aluminium isopropylate then 53 g. of 2'-methoxy - 2,2,5' - trichloroacetophenone and heats the reaction mixture so as to eliminate, by rectification, the acetone thus formed, all the while maintaining the reaction volume constant by gradual addition of isopropanol. At the end of 6 hours, the condensate containing practically no more acetone, one cools the reaction mixture to ambient temperature, pours it into a mixture of water, ice and hydrochloric acid. One extracts with ether the oil which separates out, washes with water the combined ethereal extracts, dries them and concentrates them to dryness. The residue is rectified under reduced pressure and one obtains 27.5 g. of 1-(2'-methoxy-5'-chlorophenyl)-2,2-dichloroethanol, B.P.=120.5° under 0.1 mm. of mercury.

Analysis.—$C_9H_9Cl_3O_2$=255.55. Calculated (percent): C, 42.30; H, 3.55; Cl, 41.63. Found (percent): C, 42.3; H, 3.7; Cl, 41.8.

As far as is known, this compound is not described in the literature.

In an analogous manner, starting from acetophenone or from 4'-chloroacetophenone, one obtains by chlorination, respectively, 2,2-dichloroacetophenone or 2,2,4'-trichloroacetophenone then by reduction with isopropanol in the presence of aluminium isopropylate, respectively, 1-phenyl-2,2-dichloroethanol or 1-(4'-chlorophenyl)-2,2-dichloroethanol.

EXAMPLE VI 1-(3',4'-dichlorophenyl)-2,2-dichloroethanol (I) with $X_1$=Cl at 3'; $X_2$=Cl at 4; $X_3$=H; Y=H; Z=H; (Hal)=Cl Stage A: 2,2,3',4'-tetrachloroacetophenone.—Into 44 g. of 3,4-dichloroacetophenone heated to 110° C. one causes to bubble in a stream of chlorine for two hours, then rectifies the reaction mixture under reduced pressure. One thus obtains 45 g. of crude product, B.P.= 169° C. under 13 mm. of mercury. By crystallization in petroleum ether (B.P.=65°–75° C.), one obtains 2,2,3',4'-tetrachloroacetophenone, M.P.=58° C.

Analysis.—$C_8H_4Cl_4O$=257.942. Calculated (percent): C, 37.24; H, 1.56; Cl, 54.98. Found (percent): C, 37.3; H, 1.8; Cl, 55.3.

This compound is described in Belgian Patent 619,160.

Stage B: 1-(3',4'-dichlorophenyl) - 2,2 - dichloroethanol.—Into 200 cc. of isopropanol, one introduces 45 g. of aluminium isopropylate, then a solution of 45 g. of 2,2,3',4'-tetrachloroacetophenone in 100 cc. of isopropanol. One heats the reaction mixture so as to obtain a slow distillation. One continues the heating until the distillate contains no more acetone. One cools and pours the reaction mixture into a mixture of water, ice and hydrochloric acid. By extraction of the aqueous phase with chloroform, elimination of the solvent by distillation, then rectification, one obtains 38 g. of 1-(3',4'-dichlorophenyl)-2,2-dichloroethanol, B.P.=148° C., under 2 mm. of mercury.

Analysis.—$C_8H_6Cl_4O$=259.96. Calculated (percent): C, 36.96; H, 2.32; Cl, 54.55. Found (percent): C, 37.4; H, 2.5; Cl, 54.6.

As far as is known, this compound is not described in the literature.

EXAMPLE VII 1-acetoxy-1-(2', 5'-dichlorophenyl)-2, 2-dichloroethane (I) with $X_1$=Cl at 2'; $X_2$=Cl at 5'; $X_3$=H; Y=C—$CH_3$; Z=H; (Hal)=Cl
$\phantom{Y=C}\|$
$\phantom{Y=C}O$ Into a mixture of 120 cc. of pyridine and 60 cc. of acetic anhydride, one introduces 20 g. of 1-(2',5'-dichlorophenyl)-2,2-dichloroethanol, described in Example IV, and leaves the reaction mixture for twenty hours, at ambient temperature. One pours the reaction mixture over a mixture of water and ice, separates by decantation the organic phase, extracts the mother-liquors with ether, combines the organic phases which one washes, and, after elimination of the solvent by distillation then rectification, one obtains 15.4 g. of 1-acetoxy-1-(2',5'-dichlorophenyl)-2,2-dichloroethane, B.P.=114° C. under 0.1 mm. of mercury.

Analysis.—$C_{10}H_8Cl_4O_2$=301.99. Calculated (percent): C, 39.77; H, 2.67; Cl, 46.96. Found (percent): C, 40.1; H, 2.8; Cl, 47.2.

As far as is known, this compound is not described in the literature.

EXAMPLE VIII 1-ethoxy - 1 - (2',5'-dichlorophenyl)-2,2-dichloroethane (I) with $X_1$=Cl at 2'; $X_2$=Cl at 5'; $X_3$=H; Y=—$CH_2$—$CH_3$; Z=H; (Hal)=Cl To a solution of 66 g. of triethyloxonium fluoborate (titrating 80%) in 305 cc. of methylene chloride, one adds, under an atmosphere of nitrogen, a solution of 23 g. of 1-(2',5'-dichlorophenyl)-2,2-dichloroethanol in 77 cc. of methylene chloride, and agitates for two hours, at ambient temperature. One then pours the reaction mixture into an aqueous solution of potassium carbonate, eliminates by filtering the potassium fluoborate thus formed, then separates the organic phase by decanting, washes it with water. By extraction with methylene chloride, elimination of the solvent, then rectification, one obtains 21 g. of crude product, B.P.=119° C. under 0.3 mm. of mercury, which one purifies by chromatography on silica gel, which provides, after elution with benzene, 12 g. of 1-ethoxy-1-(2',5'-dichlorophenyl)-2,2-dichloroethane.

Analysis.—$C_{10}H_{10}Cl_4O$=288. Calculated (percent): C, 41.70; H, 3.50; Cl, 49.25. Found (percent): C, 42.10; H, 3.30; Cl, 49.0.

As far as is known, this compound is not described in the literature.

NOTE.—Triethyloxonium fluoborate can be obtained, specifically, by applying the method described by Organic Syntheses, 46, 113, 1966 edition.

EXAMPLE IX 2,2,2',4',5'-pentachloroacetophenone (III) with $X_1$=Cl at 2'; $X_2$=Cl at 4'; $X_3$=Cl at 5'; Z=H; (Hal)=Cl Into a mixture of 115 g. of 1,3,4-trichlorobenzene and 173 g. of aluminum chloride, one introduces, at +10° C., 100 g. of dichloroacetyl chloride. One brings the temperature of the reaction mixture to 100° C. and introduces slowly 50 g. of dichloroacetyl chloride. One maintains the temperature of the reaction mixture at 100° C. for a further two hours and thirty minutes, pours into a mixture of water, ice and hydrochloric acid. After extracting with ether, one evaporates the solvent, rectifies the residue and obtains 92 g. of 2,2,2',4',5'-pentachloroacetophenone, B.P.=126° C. under 0.2 mm. of mercury. The product crystallizes at ambient temperature.

In an analogous manner, starting from 100 g. of 1,2,3-trichlorobenzene, one obtains, after rectification of the crude product, 73 g. of 2,2,2',3',4'-pentachloroacetophenone, B.P.=122° C. under 0.4 mm. of mercury. The product crystallizes at ambient temperature.

As far as is known, 2,2,2',4',5'-pentachloroacetophenone and 2,2,2',3',4'-pentachloroacetophenone are not described in the literature.

In an analogous manner, starting from 100 g. of p-dichlorobenzene, after four hours of heating at 110° C., one obtains, after rectification, 100 g. of 2,2,2',5'-tetrachloroacetophenone, B.P.=109° C. under 0.2 mm. of mercury. The preparation of this compound, by another route, is described in Example IV. This compound is described in the literature (B. I. Stepanov et al., Zhur. org. Khim., 2(5), 934, (1966).

These compounds serve to prepare, by reduction, the corresponding alcohols.

EXAMPLE X

Preparation of various ketones (III)

In a manner analogous to that described in Example VI, stage A, one prepares the following ketones, III:

2,2-dichloro-2',5'-dibromoacetophenone (a);
2,2-dibromo-2',5'-dichloroacetophenone (b);
2,2,2'-trichloropropiophenone (c);
2,2,2',4'-tetrachloroacetophenone (d);
2,2-dichloro-4'-nitroacetophenone (e).

Indications concerning the preparation of these compounds are summarized in Table A.

The preparations of the alcohols corresponding to these various ketones are summarized in Table B.

EXAMPLE XI

Preparation of various alcohols, I

In a manner analogous to that described in Example VI, stage B, one prepares the following alcohols, I:

1-(2',5'-dibromophenyl)-2,2-dichloroethanol (a');
1-(2',5'-dichlorophenyl)-2,2-dibromoethanol (b');
1-(2'-chlorophenyl)-2,2-dichloropropanol (c');
1-(2',4'-dichlorophenyl)-2,2-dichloroethanol (d');
1-(4'-nitrophenyl)-2,2-dichloroethanol (e');
1-(2',3',4'-trichlorophenyl)-2,2-dichloroethanol (f');
1-(2',4',5'-trichlorophenyl)-2,2-dichloroethanol (g');

compounds which, as far as is known, are not described in the literature.

Indications concerning the preparation of these compounds are summarized in Table B.

The preparation of the ketones (a), (b), (c), (d), (e) used to obtain the alcohols (a'), (b'), (c'), (d') and (e') is summarized in Table A corresponding to Example X.

The preparation of the ketones (f) and (g) used to obtain the alcohols (f') and (g') is described in Example IX.

EXAMPLE XII

1 - (2' - chloro - 5' - nitrophenyl) - 2,2-dichloroethanol (I, with $X_1$=Cl at 2'; $X_2$=$NO_2$ at 5'; $X_3$=H; Y=H; Z=H; (Hal)=Cl)

Stage A: 2,2,2' - trichloro - 5' - nitroacetophenone.—Into 286 g. of nitric acid (d.=1.51) one introduces, while maintaining the temperature at 0° C., 28.6 g. of 2,2,2'-trichloroacetophenone, described in Example I. One agitates for three hours at 0° C., then pours into a mixture of water and ice. One suction-filters the precipitate thus formed, washes it, dries it, dissolves it in ether, washes the ethereal solution with an aqueous solution of sodium bicarbonate, eliminates the solvent, crystallizes the residue in a mixture of ether and petroleum ether (B.P.=65°–75° C.) and obtains 23.8 g. of 2,2,2'-trichloro-5'-nitroacetophenone, M.P.=60° C.

*Analysis.*—$C_8H_4Cl_3NO_3$=268.49. Calculated (percent): C, 35.79; H, 1.50; Cl, 39.6; N, 5.21. Found (percent): C, 35.9; H, 1.7; Cl, 39.5; N, 5.2.

As far as is known, this compound is not described in the literature.

Stage B: 1-(2'-chloro-5'-nitrophenyl)-2,2-dichloroethanol.—Into 200 cc. of ethanol one introduces 18.5 g. of 2,2,2'-trichloro-5'-nitroacetophenone, then 9 g. of sodium borohydride and agitates for two hours at 20° C. One pours the reaction mixture into an aqueous solution of hydrochloric acid, allows to crystallize, isolates by suction-filtering, washes, dries and obtains 15.9 g. of 1-(2'-chloro-5'-nitrophenyl)-2,2-dichloroethanol, M.P.=82° C.

A sample of this product is purified by rectification, then crystallization in a mixture of ethyl ether and petroleum ether (B.P.=65°–75° C.), M.P.=82° C.

*Analysis.*—$C_8H_6Cl_3NO_3$=270.506. Calculated (percent): C, 35.52; H, 2.23; Cl, 39.32; N, 5.17. Found (percent): C, 35.5; H, 2.4; Cl, 39.5; N, 5.4.

As far as is known, this compound is not described in the literature.

TABLE A (CORRESPONDING TO EXAMPLE X)

| Ketones II | Method of operating the halogenation | Ketones III | Method of purifying III | Physical constants of III | Yield in III, percent | Analyses et cetera |
|---|---|---|---|---|---|---|
| 2',5'-dibromo-acetophenone. | 2 h. at 12° C. | 2,2-dichloro-2',5'-dibromoacetophenone (a). | Chromatography. | B.P.=136° C. (01 mm./Hg). | 68.5 | After rectification: $C_8H_4Br_2Cl_2O$=346.86 Calc'd (percent): C, 27.7; H, 1.16; Br 46.08; Cl, 20.44. Found (percent):C,27.6; H, 1.4; Br, 45.6; Cl, 20.3. |
| 2',5'-dichloro-acetophenone. | Bromine in acetic solution 2 h. at 60° C., 1 h. at reflux. | 2,2-dibromo-2',5'-dichloroacetophenone (b).[1] | Rectification. | B.P.=124° C. (0.1 mm./Hg). | 52.5 | After 2nd rectification: $C_8H_4Br_2Cl_2O$= 346.86.[3] Calc'd (percent): C, 27.7; H, 1.16; Halogen, 11.58 μ eq./1 mg. Found (percent): C, 28.3; H, 1.1; Halogen, 11.6μ eq./1 mg. |
| 2'-chloropropio-phenone. | 6 h. at 140° C. | 2,2,2'-trichloropropiophenone (c). | ...do... | B.P.=147° C. (21 mm./Hg). | 75 | |
| 2',4'-dichloro-acetophenone. | 165° C. then 4 h. at 145° C. | 2,2,2',4'-tetrachloro-acetophenone (d). | ...do... | B.P.=97° C. (0.1 mm./Hg). | 75.3 | This product contains 2,2,2,2',4'-pentachloroacetophenone and 2,2',4'-trichloroacetophenone. |
| 4'-nitroaceto-phenone. | 3 h. at 80° C. | 2,2-dichloro-4'-nitro-acetophenone (e).[3] | ...do... | B.P.=126° C. (0.05 mm./Hg). | 79 | After 2nd rectification: $C_8H_5Cl_2NO_3$= 234.04 Calc'd (percent): C, 41.06; H, 2.15; Cl; 30.3; N, 5.98. Found (percent): C, 41.0, H, 1.9; Cl, 30.2; N, 5.7. |

[1] Compound described by B. I. Stefanov and V. F. Traven Zhur. org. Khim. 1(10), 1896, (1965).
[2] Compound described by G. Cavallini et al. Boll. chim. farm. 103(1), 48, (1964).
[3] The chlorine and bromine have been determined overall, without differentiation, and the result is expressed in milliequivalents of halogen per 1 mg.

TABLE B (CORRESPONDING TO EXAMPLE XI)

| Ketones III | Alcohols I | Method of purification of I | Physical constants of I | Yield in I, percent | Analyses et cetera |
|---|---|---|---|---|---|
| 2,2-dichloro-2',5'-dibromo-acetophenone (a). | 1-(2',5'-dibromophenyl)-2,2-dichloroethanol (a'). | Rectification | B.P.=143° C. (0.3 mm./Hg). | 72.2 | After 2nd rectification: $C_8H_6Br_2O=348.87$. Calc'd (percent): C, 27.54; H, 1.73; Br, 45.81; Cl, 20.32. Found (percent): C, 27.7; H, 1.9; Br, 46.0; Cl, 20.5. |
| 2,2-dibromo-2',5'-dichloro-acetophenone (b). | 1-(2',5'-dichlorophenyl)-2,2-dibromoethanol (b'). | ...do... | B.P.=134° C. (0.3 mm./Hg). | 72 | After 2 rectifications: $C_8H_6Cl_2Br_2O=348.87$. Calc'd (percent): C, 27.54; H, 1.73; Br, 45.81; Cl, 20.32. Found (percent): C, 27.4; H, 1.9; Br, 46.1; Cl, 20.7. |
| 2,2,2'-trichloro-propiophenone (c). | 1-(2'-chlorophenyl)-2,2-dichloropropanol (c'). | Rectification plus recryst. petroleum ether. | M.P.=68° C., B.P.=110° C. (0.6 mm./Hg). | 53 | |
| 2,2,2',4'-tetrachloro-acetophenone (d). | 1-(2',4'-dichlorophenyl)-2,2-dichloroethanol (d'). | Chromatography then rectification. | B.P.=112° C. (0.25 mm./Hg). | 53 | This product contains about 10% of 1-(2',4'-dichlorophenyl)-2,2,2-trichloroethanol. |
| 2,2-dichloro-4'-nitroaceto-phenone (e). | 1-(4'-nitrophenyl)-2,2-dichloroethanol (e'). | Pasting with petroleum ether (B.P.= 35-70° C). | M.P.=92° C | 75 | After 2nd recrystallization petroleum ether: M.P.=92° C. $C_8H_7Cl_2NO_3=236.05$. Calc'd (percent): C, 40.71.; H, 2.99; Cl, 30.04; N, 5.93; Found (percent): C, 41.1; H, 3.3; Cl, 29.7; N, 5.7. |
| 2,2,2',3',4'-pentachloro-acetophenone (f). | 1-(2',3',4'-trichloro-phenyl)2,2-dichloro-ethanol (f'). | Rectification | B.P.=130° C. (0.4 mm/Hg). | 74 | $C_8H_5Cl_5O=294.4$. Calc'd (percent): C, 32.64; H, 1.71; Cl, 60.22. Found (percent): C, 33.0; H, 2.0; Cl, 59.8. |
| 2,2,2',4',5'-pentachloro-acetophenone (g). | 1-(2',4',5'-trichloro-phenyl)2,2-dichloro-ethanol (g'). | Chromatography | M.P.=78° C | 36 | $C_8H_5Cl_5O=294.40$. Calc'd (percent): C, 32.64; H, 1.71; Cl, 60.22. Found (percent): C, 32.8; H, 1.9; Cl, 60.1. |

Study of the pesticidal properties of the compounds I (I) Study of the fungicidal properties (1) Efficacy on *Alternaria oleracea* (MacCallan test on the germination of the spores): The compound under study or the standard compound is included, at different doses, in 1 cc. of sterile water to which one adds 1 cc. of a spore suspension of *Alternaria oleracea* adjusted to a concentration of 100,000 spores per cc. After 24 hours in a damp chamber at 21° C. one counts the number of germinated and non-germinated spores.

(2) Efficacy on *Botrytis cinerea* (method of incorporation in a liquid nutrient medium, development of the mycelium): To 4 cc. of nutrient medium with oat ex-extract one adds 0.5 cc. of a suspension of spores containing 250,000 spores per cc., then 0.5 cc. of an aqueous suspension of the compound under study or of the standard compound. After agitation, the test-tubes are sloped and stored at 20° C. for 6 days. The checking relies on the observation of the mycelial development at the surface of the liquid with respect to an untreated control.

(3) Efficacy on *Fusarium roseum* (method of incorporation in a nutritive agar medium, average diameter of the colonies): The compound under study and the standard compound are included, at different doses, in 5 cc. of sterile water which are then incorporated in 45 cc. of malt extract agar medium. The mixture is apportioned in two Petri dishes. After setting, four sterile cellulose pellets loaded with a spore suspension of *Fusarium roseum* are placed at four points of each Petri dish. The average diameter of the colonies serves as a criterion with respect to a contaminated, untreated control.

These tests allow specifically of putting in evidence the anti-fungal activity of the compounds of Formula I on *Alternaria oleracea*, on *Botrytis cinerea* and on *Fusarium roseum*.

(II) Study of the insecticidal properties (1) Efficacy on *Drosophila melanogaster* (vapour contact in a film on glass: Petri dishes are provided with a non-hermetic lid capable of allowing the passage of a product in the vapour state. Into each Petri dish one introduces 25 to 50 drosophilas, then places on the filter paper lining the lid 1 cc. of acetone solution containing 5000 p.p.m. of active material, the treated surface being turned upwards. The drosophilas are fed with a piece of carrot and the test is carried out with constant illumination for 24 hours at 20° C. and about 50% of relative humidity. One uses four Petri dishes per product to be tested. One carries out counting of the dead individuals every four hours for 24 hours.

(2) Efficacy on *Calandra granaria* (vapour contact in film on glass): Petri dishes are provided with a non-hermetic lid capable of allowing the vapours of the product to be tested to pass. On these lids, one arranges a filter paper. In each Petri dish one introduces 30 to 50 calandras, then puts on the filter paper 1 cc. of acetone solution containing 5000 p.p.m. of active material, the treated surfaces being placed downwards. The test takes place in an air-conditioned room at 20° C., at about 50% of relative humidity and under reduced illumination. One uses four Petri dishes per product to be tested. One carries out counting of the dead every twelve hours during 72 hours.

(3) Efficacy on larvae of *Blabera musca* (contact in film on glass): Into wide-necked Erlenmeyer flasks, closed with a gauze, one introduces five cockroach larvae measuring 2.5 to 3 cm. into each Erlenmeyer, then 2 cc. of acetone solution containing 5000 p.p.m. of active material. One uses two Erlenmeyers per product to be tested. One carries out the counting of the dead twice per day for three days.

This test allows specifically of putting in evidence the insecticidal activity of the compounds of Formula I with respect to drosophila, calandra and the larvae of the cockroach.

III: Study of the pre-emergence and post-emergence herbicidal activity: The herbicidal activity is studied on various plant species, representing the large botanical families, specifically on bean and on clover (family of Papilionaceae), on Agrostis and oat (family of the Gramineae), on chrysanthemum (family of the Compositae), on flax (family of the Linaceae) and on mustard (family of the Cruciferae). The chosen plants are cultivated in double-bottomed culture vessels with watering from below; the species are set out at a ratio of 20 seeds per species in lines separated by 3 cm. The earth mixture used comprises 10 volumes of earth, 10 volumes of river sand and 2 volumes of peat. The culture is carried out at a temperature of 20° C., the degree of humidity being about 50%. Lighting is ensured every day from six to twenty-two hours by means of "daylight and brilliant white" fluorescent tubes. The pre-emergence treatment is carried out immediately after sewing. The product under study is applied by means of a micro-pulverizer at a dose corresponding to 10 kg./ha. and at a dilution corresponding to 526 litres/ha. The first watering is carried out by sprinkling so as to carry down a part of the product to the level of the seeds. The post-emergence treatment is carried out after 21 days of cultivation. The product under study is applied by means of a micro-pulverizer at the same dose and at the same dilution as for the pre-emergence treatment.

Pre-emergence checking is carried out 21 days after treatment, post-emergence checking is carried out 15 days after treatment.

In both cases it consists in checking the percentage of reduction of the vegatation with respect to a non-treated control by carrying out weighing of the remaining sub-aerial parts.

Tables C and D give the results of the pre- and post-emergence checking for a certain number of compounds, I.

In these tables the results are arranged in three categories: 100% reduction of the vegetation, 5 to 95% reduction of the vegetation and 0% reduction of the vegetation.

TABLE C (PRE-EMERGENCE)

[Percentage of reduction of the vegetation]

| | Percent | | | | | |
|---|---|---|---|---|---|---|
| | Agrostis | Oats | Chrysan-themum | Flax | Mustard | Clover |
| 1-(2'-chlorophenyl)-2,2-dichloropropanol | 100 | 5-95 | 100 | 0 | 100 | 100 |
| 1-(2',4'-dichlorophenyl)2,2-dichloroethanol | 100 | 5-95 | 100 | 5-95 | 0 | 100 |
| 1-acetoxy-1-(2',5'-dichlorophenyl)-2,2-dichloroethane | 100 | 100 | 100 | 5-95 | 5-95 | 100 |
| 1-(2',5'-dibromophenyl)2,2-dichloroethanol | 100 | 5-95 | 5-95 | 5-95 | 0 | 100 |

TABLE D (POST-EMERGENCE)

[Percentage reductions of vegetation]

| | Percent | | | | | | |
|---|---|---|---|---|---|---|---|
| | Beans | Agrostis | Oats | Chrysan-themum | Flax | Mustard | Clover |
| 1-(2',4'-dichlorophenyl)-2,2-dichloroethanol | 100 | 100 | 5-95 | 100 | 100 | 100 | 100 |
| 1-(4'-nitrophenyl)-2,2-dichloroethanol | 0 | 100 | 0 | 100 | 5-95 | 100 | 100 |
| 1-acetoxy-1-(2',5'-dichlorophenyl)-2,2-dichloroethanol | 0 | 100 | 0 | 100 | 5-95 | 100 | 5-95 |
| 1-(2',5'-dibromophenyl)-2,2-dichloroethanol | 0 | 100 | 5-95 | 100 | 100 | 100 | 100 |
| 1-(3',4'-dichlorophenyl)-2,2-dichloroethanol | 5-95 | 100 | 5-95 | 100 | 100 | 100 | 100 |
| 1-(2',5'-dichlorophenyl)-2,2-dibromoethanol | 0 | 100 | 5-95 | 100 | 5-95 | 100 | 100 |
| 1-(2',3',4'-trichlorophenyl)-2,2-dichloroethanol | 100 | 100 | 0 | 100 | 100 | 100 | 100 |
| 1-ethoxy-1-(2',5'-dichlorophenyl)-2,2-dichloroethane | 5-95 | 100 | 0 | 100 | 100 | 100 | 100 |
| 1-(2'-chloro-5'-nitrophenyl)-2,2-dichloroethanol | 5-95 | 100 | 0 | 100 | 5-95 | 100 | 100 |

Conclusion:

At the dose of 10 kg./ha. the compounds, I, present an interesting pre-emergence herbicidal activity. At the same dose, the compounds, I, reveal a remarkable post-emergence activity on the dicotyledons and on Agrostis, and leave oats untouched or hardly attacked.

The preceding specific embodiments are illustration of the practice of the invention. It is to be understood, however, that other expedients known to those skilled in the art or disclosed herein, may be utilized without departing from the spirit of the invention or the scope of the appended claims.

We claim:

1. A method of killing undesired plants which comprises contacting the plants with a herbicidal amount of at least one compound of the formula

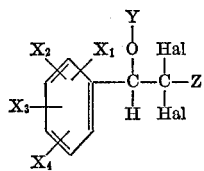

wherein $X_1$ is selected from the group consisting of hydrogen, a halogen atom, a nitro group, a lower alkyl and a lower alkoxy, $X_2$ identical with $X_1$ or different from $X_1$, is selected from the group consisting of hydrogen, a halogen atom, a lower alkyl and a lower alkoxy.

$X_3$ and $X_4$, identical with or different from one another and identical with or different from $X_1$ and/or $X_2$, are selected from the group consisting of hydrogen and a halogen atom, Y is hydrogen, Z is selected from the group consisting of hydrogen and a lower alkyl, Hal is selected from the group consisting of a chlorine, a bromine and an iodine atom.

2. The method of claim 1 wherein $X_1$, $X_2$, $X_3$ and $X_4$ are selected from the group consisting of hydrogen and halogen.

3. The method of claim 2 wherein Hal is chlorine.

4. The method of claim 1 wherein the compound is 1-(2'-methoxy-5'-chlorophenyl)-2,2-dichloroethanol.

5. The method of claim 1 wherein the compound is 1-(2',5'-dichlorophenyl)-2,2-dichloroethanol.

6. The method of claim 1 wherein the compound is 1-(2'-chloro-5'-methylphenyl)-2,2-dichloroethanol.

7. The method of claim 1 wherein the compound is 1-(3',4'-dichlorophenyl)-2,2-dichloroethanol.

8. The method of claim 1 wherein the compound is 1-(2',5'-dibromophenyl)-2,2-dichloroethanol.

9. The method of claim 1 wherein the compound is 1-(2',5'-dichlorophenyl)-2,2-dibromoethanol.

10. The method of claim 1 wherein the compound is 1-(2'-chlorophenyl)-2,2-dichloropropanol.

11. The method of claim 1 wherein the compound is 1-(2',4'-dichlorophenyl)-2,2-dichloroethanol.

12. The method of claim 1 wherein the compound is 1-(4'-nitrophenyl)-2,2-dichloroethanol.

13. The method of claim 1 wherein the compound is 1-(2',3',4'-trichlorophenyl)-2,2-dichloroethanol.

14. The method of claim 1 wherein the compound is 1-(2',4',5'-trichlorophenyl)-2,2-dichloroethanol.

15. The method of claim 1 wherein the compound is 1-(2'-chloro-5'-nitrophenyl)-2,2-dichloroethanol.

16. A method of killing insects which comprises contacting insects with an insecticidal amount of at least one compound of the formula

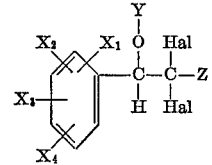

wherein $X_1$ is selected from the group consisting of hydrogen, a halogen atom, a nitro group, a lower alkyl and a lower alkoxy, $X_2$ identical with $X_1$ or different from $X_1$, is selected from the group consisting of hydrogen, a halogen atom, a lower alkyl and a lower alkoxy, $X_3$ and $X_4$, identical with or different from one another and identical with or different from $X_1$ and/or $X_2$, are selected from the group consisting of hydrogen and a halogen atom, Y is hydrogen, Z is selected from the group consisting of hydrogen and a lower alkyl, Hal is selected from the group consisting of a chlorine, a bromine and an iodine atom.

References Cited

FOREIGN PATENTS 1,039,118   8/1966   Great Britain _____ 71—122

JAMES O. THOMAS, JR., Primary Examiner

U.S. Cl. X.R.

71—106, 124, 125; 260—488 CD, 592, 612 D, 613 D, 618 D, 618 R; 424—311, 331, 342, 343